United States Patent [19]
Hirvela

[11] 3,749,897
[45] July 31, 1973

[54] SYSTEM FAILURE MONITOR TITLE

[75] Inventor: Robert J. Hirvela, Cedar Rapids, Iowa

[73] Assignee: Collins Radio Company, Cedar Rapids, Iowa

[22] Filed: Sept. 3, 1971

[21] Appl. No.: 177,720

[52] U.S. Cl. .......... 235/153 AK
[51] Int. Cl. .......... G06f 11/04
[58] Field of Search .......... 235/153 AK; 340/172.5

[56] References Cited

UNITED STATES PATENTS

| | | | |
|---|---|---|---|
| 3,226,684 | 12/1965 | Cox | 235/153 AK |
| 3,320,440 | 5/1967 | Reed | 235/153 AK |
| 3,518,413 | 6/1970 | Holtey | 235/153 AK |
| 3,566,368 | 2/1971 | De Blauw | 340/172.5 |
| 3,312,951 | 4/1967 | Hertz | 340/172.5 |
| 3,582,633 | 6/1971 | Webb | 235/153 |
| 3,226,684 | 12/1965 | Cox | 235/153 |

*Primary Examiner*—Charles E. Atkinson
*Attorney*—Bruce C. Lutz et al.

[57] ABSTRACT

The method of and circuitry for detecting failure of a computer system. The computer system failure is detected by requiring the computer to periodically complete a diagnostic routine within a preset time and in doing so the machine must proceed through a specific number of "states." Any alteration from the prescribed time or sequence for completion of the routine will indicate a failure.

8 Claims, 5 Drawing Figures

PATENTED JUL 31 1973

3,749,897

SHEET 2 OF 4

SYSTEM FAILURE MONITOR TITLE

THE INVENTION

The present invention is related generally to computers and more specifically to a method of detecting computer failure.

The prior art has contained various computer failure detection techniques. One such technique has been to insert an instruction in the computer program which will reset a time out circuit which will produce an alarm if it is not reset periodically. If the computer is proceeding through the program properly and if the reset instruction is executed often enough, theoretically the alarm will only be activated when the machine fails and the program is not followed. However, the computer can fail so as to get stuck in a circular path in the program containing such a reset instruction and in this manner the test routine instruction will be repeated often enough so that the alarm will never operate. The present idea, on the other hand, utilizes the concept of resetting circuitry during a periodically executed test routine consisting of an exact, predictable instruction sequence, such that the reset must coincide with a predetermined control state in the known sequence of control states associated with the execution of the reset instruction. If the reset does not occur in the prescribed manner, or additionally, if it fails to occur within a predetermined time, an alarm will be set indicating that the machine is in a failure mode.

It is therefore an object of the present invention to provide an improved method of detecting failures in a computer and/or computer program. Other objects and advantages of the present invention will be ascertained from a reading of the specification and claims along with the figures wherein:

Figure 2:
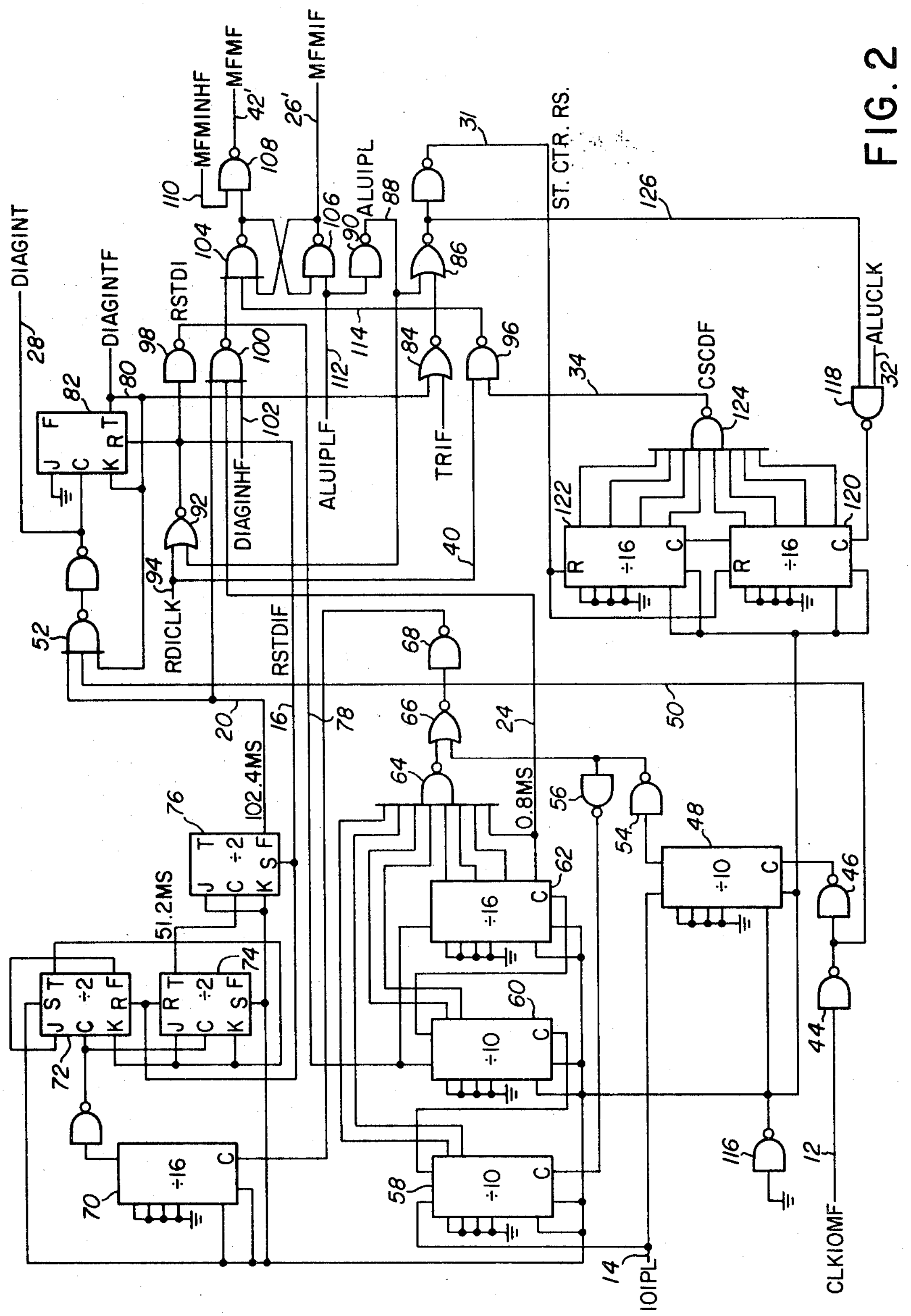
FIG. 2 is a detailed logic diagram of the circuitry in FIG. 1.
Figure 3A:
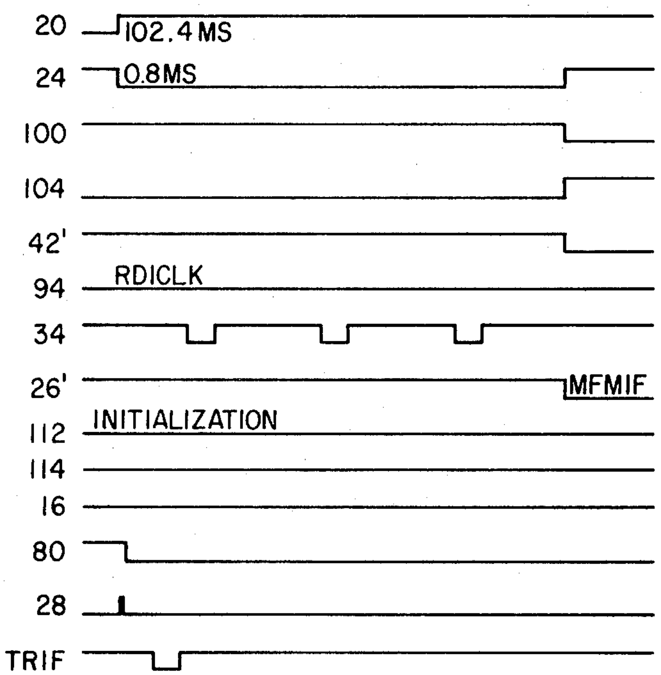
Figure 3B:
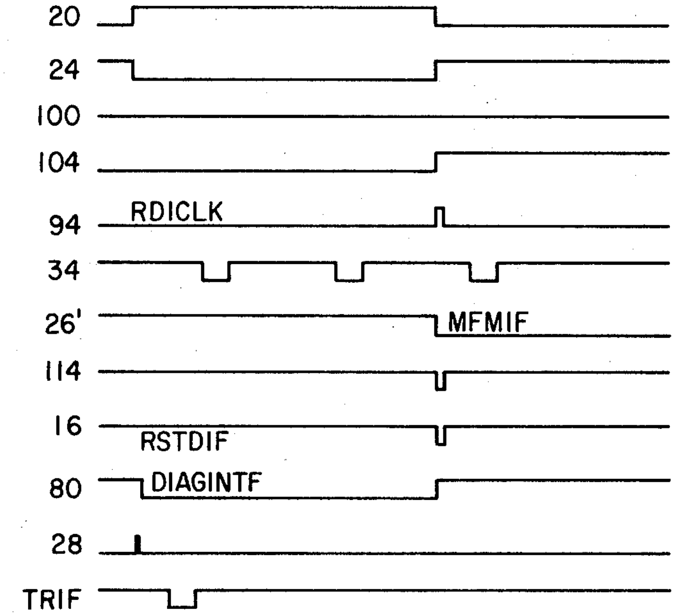
Figure 3C:
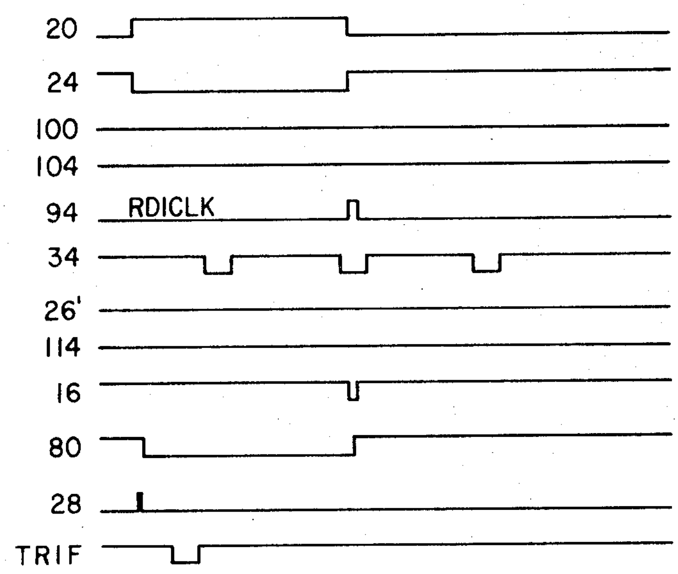

FIGS. 3A, 3B, and 3C are timing diagrams associated with FIG. 2.

Figure 1:
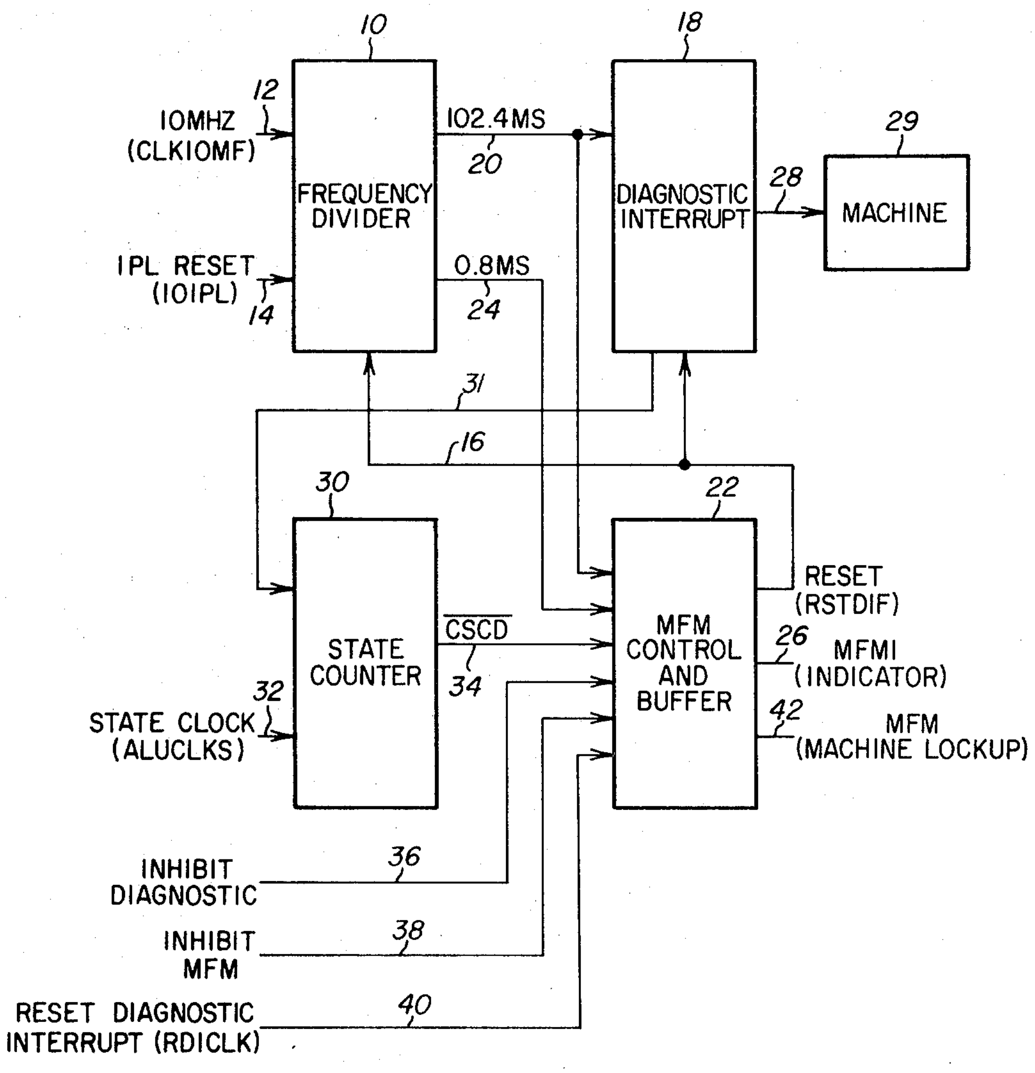
FIG. 1 is a block diagram of the circuitry required to practice the inventive concept.

FIG. 1 contains a frequency divider 10 having a high frequency clock input 12 which in one embodiment of the invention was at a frequency of 10 MHz. The divider 10 also has an initial program load or IPL reset 14 which is also labeled IOIPL. A further reset input 16 is labeled reset diagnostic instruction false (RSTDIF). This lead 16 is also applied to a diagnostic instruction block 18. An output 20 from frequency divider 10 is supplied as an input to block 18 and also to a machine failure monitor control and buffer block 22. This output on lead 20 is a 102.4 millisecond pulse which during normal machine operation will be in a logic 0 condition a majority of the time. In other words, this signal changes to a logic 1 whenever it is desired that there be a diagnostic interrupt to activate the diagnostic test routine. A lead 24 is also applied from frequency divider 10 to control and buffer 22. Lead 24 contains a 0.8 millisecond pulse. It will be noted that 0.8 milliseconds is integrally dividable into 102.4 milliseconds and this pulse changes to a logic 0 at the instant that the 102.4 millisecond pulse changes to a logic 1. Eight-tenths of a millisecond later this pulse returns to a logic 1 if the diagnostic test routine has not been completed by this time and causes a failure indication from unit 22 on a lead 26. However, if the diagnostic routine has been satisfactorily completed prior to the 0.8 millisecond time limit, a reset is supplied on lead 16 to change the frequency divider to 0 and start the 102.4 millisecond pulse again. An output lead 28 from diagnostic interrupt 18 is supplied to the arithmetic logic control unit internal logic of computing apparatus or machine 29 a second output 31 is supplied to a state counter 30. The information on lead 28 is utilized to indicate to the ALCU that upon completion of the present state the program is to be interrupted and a diagnostic routine is to be completed. This indication also causes the state counter 30 to be set to 0 so that it may count the number of states involved in completing the diagnostic routine. The counter 30 contains an input lead 32 which provides the state clock. Counter 30 also has an output lead 34 which is labeled CSCD and is supplied to block 22. Further apparatus inputs to block 22 are inhibit diagnostic 36, inhibit machine failure monitor 38 and reset diagnostic interrupt (RDICLK) 40. A final output from block 22 is machine failure monitor 42 which causes lock-up of the machine or computer system. As will be realized, a signal on lead 26 merely indicates machine failure while a signal on lead 42 actually causes lock-up of the machine. These two signals are provided since it is sometimes desirable to merely have an indication of failure without stopping operation of the machine.

As indicated previously, FIG. 2 is a detailed logic diagram of the contents of FIG. 1. Where applicable, the same designations used in FIG. 1 have been repeated in FIG. 2. In some cases, however, there is not a direct correspondence and different numbers are used. The clock input 12 to the frequency divider is supplied through a pair of NAND gates 44 and 46 to a clock input of a divide by ten counter 48. A point intermediate NAND gates 44 and 46 is supplied via a lead 50 as an input to a NAND gate 52 utilized as part of the diagnostic interrupt. The use of the two NAND gates 46 and 44 are merely to put the clock input from 12 back into its original form before being supplied to the divide by ten block 48. The divided output of divider 48 is a 1 MHz signal which is supplied through a pair of NAND gates 54 and 56 to a clock input of a divide by ten counter 58. The output of this counter is thus a 100 kHz signal and is supplied to the input of a divide by 10 counter 60. The 10 kHz output of this counter is supplied to a divide by 16 counter 62. One of the outputs of counter 62 supplies the previously referenced 0.8 millisecond pulse on lead 24. Selected outputs of the counters 58, 60, and 62 are utilized as a summation to NAND gate 64 to supply clock signals through a NOR gate 66 and a further NAND gate 68 to a clock input of a divide by 16 counter 70. NOR gate 66 receives an input from a point intermediate NAND gates 54 and 56 to align the output signal with the main clock such that the signals on leads 20 and 24 will remain in synchronism. The output of divider 70 is supplied to a ÷ by 2 flip-flop 72 and from there through a further pair of ÷ by 2 flip-flops 74 and 76 until the output of flip-flop 76 is the 102.4 millisecond pulse supplied on lead 20. The flip-flops 72, 74, and 76 require a logic 0 reset as supplied on lead 16. However, the reset for the counters 60 and 62 is a logic 1 and this is supplied on a reset diagnostic instruction lead 78. The resets appearing on leads 16 and 78 are provided at substantially the same time and reset both portions of the frequency divider to 0 so that they commence simultaneously. The NAND gate 52, which was previously mentioned, is shown having inputs from leads 20 and 50. A further input is obtained from the diagnostic instruction false lead 80 obtained from the T output of a J-K flip-flop 82. The output of NAND gate 52 is supplied through a further NAND gate to the clock input of gate 82. As will be observed, the output 28 to the arithmetic logic control unit is obtained from the clock input of flip-flop 82. As may be ascertained, the clock input to flip-flop 82 is provided only when leads 20 and 80 are at a logic 1 so that the next clock on lead 50 can change the state of flip-flop 82 and provide a logic 0 output on lead 80. Lead 80 is also supplied to a NOR gate 84 whose output is supplied as one input to a NOR gate 86. NOR gate 84 also has an input labeled TR1F which is indicative of a control flip-flop in the arithmetic logic control unit. NOR gate 86 has an input on lead 88 which is labeled ALUIPL or arithmetic logic unit initial program load. Lead 88 is connected to the output of a NAND gate 90 and is also connected as an input to a NOR gate 92. NOR gate 92 contains a reset diagnostic instruction clock (RDICLK) input on a lead 94. Lead 94 is also supplied as an input to a NAND gate 96. The output of NOR gate 92 is the lead 16 which is supplied not only to flip-flops 72, 74, and 76, but also as a reset input to the diagnostic interrupt flip-flop 82. In addition, lead 16 is supplied as an input to a NAND gate 98 which inverts the signal and supplies, as an output, the signal appearing on lead 78. The lead 20 additionally is supplied to a NAND gate 100 which has as a second input lead 24 and as a third input a lead 102 labeled DIAGINAF or diagnostic inhibit false. An output of NAND gate 100 is supplied to a cross-coupled pair of NAND gates 104 and 106 which form a latching circuit or variation of a flip-flop. An output of NAND gate 104 is connected to a NAND gate 108 having a second input of machine failure monitor inhibit false. This second input is labeled 110. The output of NAND gate 108 is labeled 42' since it is the false indication of the lead 42 in FIG. 1. The NAND gate 106 has an output 26' which is the false indication of lead 26 in FIG. 1. A lead 112 is labeled ALUIPLF or arithmetic logic unit initial program load false and is supplied as the only input to NAND gate 90 and as an input to NAND gate 106. The other input of NAND gate 106 is obtained from the output of NAND gate 104 with the output of NAND gate 106 being supplied as a second input to NAND gate 104. A final input to NAND gate 104 is supplied from the output of NAND gate 96. This is provided on lead 114.

As may be ascertained, the first portion of the discussion dealt with the frequency divider of FIG. 1 and comprised the frequency counters, etc., necessary to provide the outputs 20, 24, and 50. The diagnostic interrupt block 18 of FIG. 1 comprises mainly the blocks 52 and 82 of FIG. 2. The remaining circuitry discussed in FIG. 2 to this point primarily comprises the control and buffer unit 22 of FIG. 1. The remaining circuitry of FIG. 2 yet to be discussed comprises the state counter 30. A NAND gate 116 is connected to ground and is utilized to provide a logic 1 to a large portion of the previous and present circuitry. This is a standard design procedure and need not be elaborated upon. Other inputs of the counters or dividing circuits are connected to ground or logic 0 to conform with good design practices. Again, it is believed further comment is unnecessary. The input lead 32 is connected to a NAND gate 118 whose output is connected as a clock input to a divide by 16 unit 120. An output signal having one-sixteenth the frequency is supplied as an input to a further divide by 16 counter 122. The binary outputs, of the two dividers 120 and 122, are supplied to eight inputs of a NAND gate 124 whose output is lead 34. The output of NAND gate 124 is a logic 1 except for the single cycle every 256 counts when all of the outputs are a logic 1 from counters 120 and 122. At this time lead 34 changes to a logic 0 for the time period of one clock cycle appearing on lead 32. A second input to NAND gate 118 is supplied from NOR gate 86 on lead 126.

The timing diagrams of FIG. 3 are labeled in accordance with the component or lead of FIG. 2 wherein signals appear. FIG. 3A illustrates the situation when no reset diagnostic instruction appears within the 0.8 milliseconds alloted time. FIG. 3B illustrates the waveforms occurring when a reset diagnostic insruction is erroneously received at a time other than the count of 255 from the state counter or lead 34. FIG. 3C illustrates the waveforms obtained with the reset diagnostic instruction received at the desired and proper time.

OPERATION

As a partial repeat of the previous material, the apparatus of FIG. 1 operates as follows: Every 102.4 milliseconds the frequency divider 10 provides an output indicating that the program is to be interrupted and a diagnostic routine is to be commenced. The diagnostic interrupt 18 provides a signal to the machine 29, which interrupts the program and sets a state logic flip-flop to a logic 0 position indicating the commencement of the diagnostic routine. This detailed portion of the computer or machine is not shown. In addition, the interrupt block 18 provides a signal to the state counter 30 to commence counting further state completions or progressions of the computer unit.

As indicated, the diagnostic or test routine contains a reset diagnostic instruction at some point therein. The control unit 22 monitors lead 40 for occurrence of this instruction. During this time the state counter 30 is counting to 255 and commencing over. Each time that it reaches a count of 255 an output is provided on lead 34. If the output on lead 34 does not coincide with a signal on lead 40, an erroneous indication is provided on 26. If so desired, a signal can be provided on lead 42 to lock up the machine and prevent further operation. Further, if the signal on lead 40 is not provided within 0.8 of a millisecond after commencement of the diagnostic routine, signals appear on output leads 24 and, if so desired, 42.

Referring now to FIG. 2 in connection with FIG. 3A, the circuit operation will be described in the instance wherein no reset diagnostic instruction is provided on leads 94 and 40. In this instance the lead 20 will change from a logic 0 to a logic 1 to provide a one input to NAND gate 52. Flip-flop 82 had previously been set by the last reset diagnostic instruction so that a logic 1 appears on lead 80. Thus, at the time of the next 10 MHz signal pulse appearing on lead 50, the flip-flop 82 will be clocked and the output at 80 will change to a logic 0. This has been exaggerated in all of the timing diagrams of FIG. 3 to more clearly show this slight lag in operation. An output will be provided on lead 28 indicative of the signal pulse going to the ALCU to indicate an interruption of the normal program routine so that the flip-flop indicative of this operation may be set to a logic 0. Since this signal on lead 28 causes a clocking of flip-flop 82 and the output lead 80 to change from a logic 1 to a logic 0, no more pulses from the clock 12 will pass through NAND gate 52 because one of the inputs, lead 80, will remain at a logic 0 until such time as the flip-flop is reset and lead 20 then changes to a logic 0.

When the flip-flop in the ALCU is set to a 0, a logic 0 will appear on lead TR1F to provide a logic 1 output from NOR gate 84. As explained in connection with timing diagram 80, the commencement of TR1F has also been exaggerated for clarity to show that this alteration in logic level will occur after the pulse on lead 28 and after the completion of the then present state of the program being executed.

The lead 112 is set to a 1 after initialization of the system and thus lead 88 is a logic 0. The signal TR1F, as supplied on lead 126, temporarily deactivates the clock signals being provided on lead 32 to counter 120. This output, as obtained from lead 31, then resets the state counter to a zero condition while input clocks are being repressed such that the counter will commence at exactly the right time.

As previously explained, NAND gate 124 provides a logic 1 output except for the count of 255 when a logic 0 is provided on lead 34. The timing diagram for lead 34 is shown. As will be further noted in FIG. 3A, the lead 102 is set to a logic 1, while after commencement of the diagnostic routine lead 20 is a logic 1 and lead 24 is a logic 0. Thus, the output of NAND gate 100 is a logic 1. If there is not reset diagnostic instruction on lead 94 prior to the occurrence of 0.8 milliseconds, there can be no reset signals on leads 16 and 78 and thus no further count of 102.4 milliseconds until the next diagnostic interrupt. Therefore, at the expiration of the 0.8 milliseconds, lead 24 becomes a logic 1 as shown in FIG. 3A thereby providing a logic 0 output from NAND gate 100 to cause the output of NAND gate 104 to increase to a logic 1 level. As will be realized, the previous application of all logic 1's to the input of 104 produces a logic 0 output so that the cross-connected NAND gate 106 has a logic 0 input and thus has a logic 1 output. If lead 110 is set to a logic 1, the change of the output of NAND gate 104 to a logic 1 will provide a 0 output on lead 42′ and thus provide an indication to the proper unit in the machine to shut it down. With the output of NAND gate 104 changing to a logic 1, the NAND gate 106 will thus provide a logic 0 output and provide an indication to the machine unit that there has been a failure.

FIG. 3B illustrates an example using substantially the same timing diagrams except that a reset diagnostic instruction is received. However, FIG. 3B is based on the assumption that the reset diagnostic instruction is received at the time other than the count of 255 in the state counter. Further, the reset diagnostic instruction is received prior to the 0.8 millisecond signal on lead 24. In this instance the occurrence of a logic 1 on lead 40 (94) at a time when lead 34 is at a logic 1 (thereby indicating it is not at count 255) will produce a logic 0 output from NAND gate 96 on lead 114. This will produce the required 0 input to NAND gate 104 to alter the state of NAND gates 104 and 106 as previously indicated to provide the false outputs on lead 26′ and as previously described on lead 42′.

It was previously assumed that both leads 102 and 110 were in a logic 1 condition. It can be readily ascertained that if lead 110 is set to a logic 0 that the indication of a failure will appear on lead 26′ but the logic 0 will prevent a logic 0 output from NAND gate 108 and prevent shut down of the machine. The embodiment in which this idea was used also contained the lead 102 so that this could be connected to a logic 0 level and prevent operation of the entire diagnostic interrupt if so desired.

Reference will now be made to FIG. 3C where a proper reset diagnostic instruction is received at the time that the state counter has reached its second count of 255. In normal practice, the state counter will roll over past the 255 count several times before the reset diagnostic instruction pulse on lead 94 is provided since the diagnostic routine will normally be many more steps than 255. However, for convenience, only two times are shown. As will be noted, the simultaneous occurrence of lead 34 going negative thereby indicating a count of 255 at the time of the positive going pulse on lead 94 prevents a logic 0 from appearing on lead 114 and thereby producing a failure indication.

In both FIGS. 3B and 3C the reset diagnostic instruction operates to reset the frequency divider via leads 16 and 78 to commence counting again. This reset is provided even when it is erroneous and a failure is indicated as shown in FIG. 3B. In FIG. 3C this resetting causes the device to wait another 102.4 milliseconds before interrupting the program again to commence another diagnostic test routine. The completion of the diagnostic test routine of course resets the diagnostic interrupt flip-flop to a logic 1.

While a given specific embodiment has been described in detail with timing diagrams utilized to illustrate the operation of that specific embodiment, the invention is not so limited. Rather, the invention is merely limited to the idea of providing a computer failure indication and if so desired a lock-up of the computer when after a periodic diagnostic interrupt and commencement of a diagnostic test routine the signal indicating completion of the routine is not received within a predetermined time or if it is received when the computer control logic has passed through a number of states which produces a prescribed count or its multiple.

Thus, I wish to be limited not by the specification but only by the appended claims, wherein:

I claim:

1. The method of continuously checking a computer system comprising, in combination:

periodically and automatically halting normal operation and then initiating a multistep computer system selftest program routine;

counting the steps required to complete the selftest routine on a recirculating basis;

providing an output indicative of computer system failure when the number of steps required to complete the selftest routine varies from a predetermined number;

providing an output indicative of computer system failure when the completion time of said selftest routine exceeds a predetermined time; and resuming normal operation upon completion of the self-test routine when no system failure output is provided.

2. Apparatus for monitoring operations of a programmable machine means comprising, in combination;

first means for periodically interrupting normal program operation of the machine means and for commencing a multistate diagnostic test routine including a reset instruction;

second means connected to said first means for commencing counting on a recycling basis the number of states completed in said test routine in response to a signal from said first means;

third means for providing an output upon occurrence of said reset instruction; and first logic means connected to said third means and said second means for receiving signals therefrom for providing a machine failure indication when said reset instruction occurs at a time other than a predetermined count by said second means.

3. Apparatus as claimed in claim 2 comprising, in addition:

fourth means for providing an output signal in response to the passage of a predetermined time after commencement of said diagnostic test routine; and further logic means connected to said first logic means for providing a machine failure indication when said reset instruction does not occur within said predetermined time.

4. Monitoring apparatus comprising, in combination:

computer apparatus means including priority program interrupt means, interrupting normal low priority program operations in the computer apparatus;

resettable first means for periodically providing a signal to said priority interrupt means whereby said computer apparatus commences a multiple state diagnostic test routine containing at least one reset instruction;

second means for providing an output signal a predetermined time after commencement of said multiple state diagnostic test routine;

reset third means for providing an output signal upon occurrence of said reset instruction in said diagnostic test routine; and failure indicating fourth means connected to said third means and to said second means for providing a failure output if said second means provides an output signal prior to an output signal being obtained from said third means.

5. Apparatus as claimed in claim 4 including means for receiving said output signal from said third means and thereupon resetting said first means to an initial condition.

6. Apparatus as claimed in claim 5 comprising in addition:

state count fifth means for counting the number of states completed in said diagnostic test routine and for providing an output indicative of the completion of a predetermined number of states; and further means connected to said third means and said fifth means for providing a failure indication when said output signal of said third means occurs at a time other than coincident with the output signal from said fifth means.

7. In the operation of computing apparatus, a new method of detecting failure of a program operation portion of said computing apparatus, said computing apparatus being interconnected to include:

priority interrupt means for interrupting normal program operations;

logic means;

timing means; and failure indicating means;

said new method comprising;

initiating a multistep test routine periodically in accordance with an output from said timing means;

providing a reset instruction in said test routine for resetting said timing means upon the occurrence thereof;

providing an output signal indicative of computing apparatus failure when said reset instruction output is not obtained within a predetermined time after initiation of said multistep test routine; and resuming normal program operations upon completion of the test routine when no failure output signal is provided.

8. The method of claim 7 wherein a state counting means is additionally interconnected in said computing apparatus and comprising the additional steps of:

counting the steps completed in the test routine; and providing an output indicative of computer system failure when the reset instruction output occurs noncoincidentally with a predetermined number of completed steps in the test routine.

* * * * *